Patented Jan. 26, 1937

2,068,926

UNITED STATES PATENT OFFICE 2,068,926

METHOD OF MAKING ARTIFICIAL LUMBER

James V. Nevin, Aberdeen, Wash.

No Drawing. Application August 27, 1934,
Serial No. 741,744

9 Claims. (Cl. 92—21)

This invention relates to a method of making artificial lumber and the like from waste raw wood, sawdust, shavings and the like.

In my prior issued Patent No. 1,899,768, dated February 28, 1933, I have described a method of making wood fiberboard from sawdust and other waste woody material by the use of a synthetic resin as a binder. The method of my present invention differs in some material respects from that disclosed in my patent and constitutes an improvement thereof.

According to my present method, the waste, raw woody material is first disintegrated in a wet state to prevent unnecessarily fine subdivision of the fibrous material. A water soluble partial condensation product capable of forming a synthetic resin is introduced into the aqueous fibrous mass and so treated as to cause the partial condensation product to be thoroughly distributed therein and impregnate the fibers. The resulting mass of impregnated fibers is then caused to flow onto a draining surface, such as a forming wire or the like, to produce a felted mat of the fibers. A precipitating agent may be added prior to the mat or web forming stage so as to cause solid particles of the partial condensation product to become dispersed throughout the fibrous mass. After removing a considerable proportion of the water from the felted fibrous mats or sheets, as by suction, pressing, partial drying or the like, the sheets are subjected to sufficient heat and pressure to convert the partial condensation product into a resin that serves to bind the fibers together into a relatively hard, coherent, board-like product.

A method such as described has the advantage that the strength and characteristics of the fibrous material are more fully retained than if the fibrous material is disintegrated in a dry condition, since such a step results in a large proportion of fine, flour-like particles. My present method also has the advantage that the resin forming partial condensation product is produced in situ in an aqueous mass of the fibrous material and thereby more thoroughly and uniformly impregnates the individual fibers.

In contrast with certain other types of artificial lumber, wallboard and the like, the product of my present invention exhibits no laminated effect upon being ruptured. This is for the reason that in my method the impregnated fibers are deposited in a single thick mat on a forming wire or screen instead of being deposited in successive layers that are subsequently united.

It is an important object of this invention to provide a method of making artificial lumber and the like having the advantages enumerated and at a cost of manufacture that will enable the product of my invention to compete satisfactorily with other similar products and with natural lumber.

It is a further important object of this invention to provide a method of making artificial lumber and the like wherein a very small proportion of a relatively cheap synthetic resin is efficiently utilized as the binder for coalescing the fibers together.

Other and further important objects of this invention will become apparent from the following description and appended claims.

The source of the fibrous material used in the manufacture of my artificial lumber, wallboard or the like may suitably be a waste raw woody material, such as sawdust, chips, shavings, trimmings from veneer plants and the like, and other ligno-cellulosic material. I prefer not to use digested or chemically treated cellulosic material, such as is used in paper making or as is found in waste papers, but rather instead to use waste woody materials in their natural, uncooked state. Not only are there extensive and cheap sources of such materials, but when these materials are used in their natural, raw state, the natural resinous and gummy materials, ligneous matters and the like that are present augment the binding qualities and the binding capacity of the synthetic resin employed.

The waste wood or woody material is shredded or otherwise comminuted in a wet state in order to avoid unnecessarily fine subdivision. Preferably the woody material is disintegrated while in a substantially saturated condition, that is, with a moisture content of around 45 to 50%. The disintegrated product may be screened in order to eliminate oversize particles or fibers, the degree of fineness of the screen being dependent upon the particular type of artificial lumber, wallboard or composition board that is desired.

After the waste woody material has been disintegrated into a wet, pulpy mass, a partial condensation product capable of forming a synthetic resin is incorporated into the fibrous mass. The incorporation can be accomplished in any of a number of ways. For instance, the raw ingredients may be added directly to the fibrous mass and the mixture subjected to heat and agitation to form a water soluble partial condensation product within the mixture. Alternatively, an aqueous solution of a partial condensation product may be prepared separately and the solution then added to the fibrous mass in proper proportion. In either case the amount of water associated with the fibrous material is first calculated and then a sufficient quantity of water incorporated with the resin forming ingredients or with the aqueous solution of the partial condensation product to give a consistency of about 1 lb. of dry fiber to 4 gallons of water, or approximately a 3% consistency on the basis of the dry fiber.

Various types of synthetic resins may be employed as the binder in the preparation of my product. I prefer, however, to use synthetic resins of a phenolic and urea type, or mixtures of the two. In place of using phenol as such, it is preferable to use meta cresylic acid or crude cresylic acid, since cresylic acid is considerably cheaper than phenol. However, a crude grade of carbolic acid may be employed if desired. Various grades of urea are available on the market, such as a technical grade or a so-called fertilizer grade, both of which run above about 99% purity. The usual types of methylene condensation agents may be used in conjunction with the cresylic acid and/or urea, such as an aqueous solution of formaldehyde, hexamethylenetetramine, polymers of formaldehyde and the like. An aqueous solution of formaldehyde has been used entirely satisfactorily.

The following examples will serve to illustrate methods of preparing various types of aqueous binding solutions.

*Example 1*

| | Parts by weight |
|---|---|
| Urea | 14 |
| Formaldehyde (40% aqueous solution) | 42 |
| Meta crysylic acid | 0.4 |
| Sodium arsenate | 1.8 |
| Water | 0.5 |
| Barium acetate or zinc acetate | 0.2 |

The urea and formaldehyde are mixed together until the urea is dissolved and the solution is then filtered to remove any insoluble matters. A solution of the sodium arsenate in a minimum quantity of water is added to the filtered solution and stirred until thoroughly mixed. The meta cresylic acid is next added and the mass consisting of urea, formaldehyde solution, sodium arsenate and meta cresylic acid, is placed in a pressure cooker. Heat is applied to the pressure cooker, as by means of indirect steam, and heating continued under such slight pressure as may be developed within the cooker until the temperature of the mass rises to about 99° C., or slightly under the boiling point of water. There is no loss of water content, as the heating is carried out in a closed vessel.

After the heating has been continued for about 5 to 30 minutes at a temperature slightly below the boiling point of water, heating is discontinued and the barium acetate or zinc acetate, dissolved in 0.5 parts by weight of water, is added to the mixture. The resulting solution is allowed to cool in the cooker and is then ready to use as a binder in the manufacture of artificial lumber or the like. As thus prepared, the binding agent has a specific gravity of approximately 1.1694 at 20° C., or about 20° Bé. The aqueous solution of the resin forming ingredients may be diluted with water to the desired extent, depending upon the amount of water associated with the fibrous mass to be impregnated.

Alternatively, as pointed out above, the urea, formaldehyde and cresylic acid may be directly incorporated into the aqueous fibrous mass in the proper proportions with respect to the amount of fiber present and the whole mass subjected to heat in a pressure cooker as described above. The pressure cooker should, of course, be provided with efficient agitating means. In this case the partial condensation product is formed in situ within the fibrous mass instead of being prepared separately in an aqueous solution.

The proportion of resin forming ingredients to fiber will depend upon the properties desired in the finished artificial board or other product that is being made. In general, the proportion of solid resin on the basis of dry fiber in the finished product may range between 3 and 25%. Between 4 and 6% of resin solids to dry fiber is commonly used in the manufacture of the wall board of my invention, but if greater strength and increased water and fire resistance is desired, larger proportions of the synthetic resin may be used, say from 8 to 10%. The increased cost of manufacture due to the use of larger percentages of synthetic resin will, in general, prohibit the use of resin forming ingredients in proportions larger than those indicated.

In the foregoing formula, sodium arsenate is employed as the condensing agent. Other condensing agents of an alkaline character may be used, such as caustic soda, ammonia water, lime water (aqua calcis) and the like. Barium acetate and zinc acetate are employed as accelerating agents to hasten the completion of reaction between the urea and formaldehyde. Although these reagents may have a slight alkaline reaction upon hydrolysis, their effectiveness is not dependent upon their alkalinity but they are considered as neutral condensing agents. Other reagents, such as sodium acetate, manganese acetate, magnesium acetate and the like may be substituted in whole or in part for the barium or zinc acetate.

In the formula of Example 1, the cresylic acid serves not only to utilize any excess of formaldehyde present over that necessary to react with the urea, but also imparts added flexibility and resiliency to the resinous binding composition. Meta cresylic acid may be used to replace all of the urea, but I have found that a composition containing urea and up to about 3% of cresylic acid, based on the weight of urea, imparts a better finish to the artificial lumber, board, or the like. Formaldehyde solution may be used in proportions exceeding 3 parts of formaldehyde to 1 part by weight of urea but any such excess is largely wasted.

*Example 2*

The following formula, in which parts by weight are given, illustrates a further embodiment of my invention in the use of resinous binding materials:

| | Parts |
|---|---|
| Urea | 100 |
| Cresylic acid | 100 |
| Formaldehyde (40% aqueous solution) | 400 |
| Caustic soda | 6 |

The sodium hydroxide or caustic soda is first made up into an aqueous solution, say of 38° Bé., and then added to the cresylic acid with stirring. A part of the caustic soda reacts with the cresylic acid to form sodium cresylate, which is water soluble. The water solubility of the mixture is thereby increased. The mixture of cresylic acid, sodium cresylate, caustic soda and water is then added to a filtered solution of urea and formaldehyde and the mass heated at slightly below the boiling point of water in a pressure cooker, as described in Example 1. Condensing agents may be used as described in Example 1 or may be omitted.

Example 3

The following formula illustrates a resin forming composition prepared from cresylic acid and formaldehyde, without the use of urea:

|  | Parts |
|---|---|
| Cresylic acid | 200 |
| Formaldehyde (40% aqueous solution) | 200 |
| Caustic soda | 10 |
| Ammonium hydroxide (28% aqueous solution) | 10 |
| Triethanolamine | 0.5 |
| Water | 385 |

The 10 parts of caustic soda are dissolved in water to form about a 38° Bé. solution and this solution added to the cresylic acid. Formaldehyde, ammonia and triethanolamine are next added and the mixture agitated and heated to about 70 to 80° C., at which temperatures the mixture is maintained for about 15 minutes. It is then allowed to cool gradually to below 60° C. and water is slowly added with stirring until the specified amount has been incorporated. Dilution of the solution may, however, be carried to any degree desired, between 2 and 10° Bé., without causing precipitation of the resin forming ingredients.

The caustic soda aids in increasing the solubility of the initial condensation product produced by the reaction between formaldehyde and cresylic acid, or sodium cresylate. The triethanolamine, which may be a commercial mixture of the tri-, di- and mono-ethanolamines, acts as an emulsifying agent to prevent precipitation of the partial condensation product. It is important to note that there is no concentration of the liquid mass during the heating period and that the reaction is not carried beyond the point at which the partial condensation product is still water soluble, or capable of forming a stable emulsion in water.

Example 4

To the formula given under Example 3, there may be added about 0.5 parts by weight of oleic acid (red oil) as an aid to emulsification. Also, instead of heating the mass to 70 to 80° C., the heat of reaction between the various ingredients may be utilized to bring the mass up to a temperature of about 70° C. and the mass maintained at that temperature for about 30 minutes. The mass then becomes relatively thick and viscous and may be thinned by the addition of the amount of water specified in Example 3, the water being added at a temperature of about 70° C. with constant stirring. The mass initially becomes milky upon the addition of water but gradually clears up. Alcohol, such as denatured ethyl alcohol, or wood alcohol, may be added in quantities of from 50 to 100 parts by weight to further reduce the viscosity and increase the penetrating powers of the aqueous mixture.

Example 5

|  | Parts by weight |
|---|---|
| Cresylic acid | 500 |
| Formaldehyde (40% aqueous solution) | 500 |
| Linseed oil | 300 |
| Potassium hydroxide | 80 |
| Alcohol | 30 |
| Water | 120 |

In making up this formula, the linseed oil is heated in a tared vessel of a capacity equal to about four times the bulk of the ingredients to a temperature of 70° C. The potassium hydroxide is dissolved in a small quantity of water, the solution warmed to 70° C. and added to the linseed oil, with stirring. The alcohol is then incorporated and heating continued without stirring until a small portion is found to be soluble in boiling water without the separation of oily drops. While still warm, the cresylic acid is added and mixed thoroughly, maintaining the temperature at about 70° C. until a clear solution is produced. The water and formaldehyde are then added and the mixture agitated while maintaining at about 70 to 80° C. for approximately 15 minutes. Condensing and accelerating agents may be added if desired. Instead of 80 parts of potassium hydroxide, 54 parts of sodium hydroxide may be used. After cooling, the solution is ready for use.

Example 6

|  | Parts |
|---|---|
| Cresylic acid | 200.0 |
| Formaldehyde (40% aqueous solution) | 216.0 |
| Caustic soda | 32.0 |
| Triethanolamine | 0.5 |
| Oleic acid | 0.3 |
| Water | 500.0 |

20 parts of caustic soda are dissolved in water to form about a 38° Bé. solution and this solution added to the cresylic acid; then, formaldehyde, oleic acid and triethanolamine are added and the mixture agitated. The heat of reaction between the various ingredients brings the mass up to a temperature of from about 70° C. to 96° C. and the mass maintained at that temperature for about sixteen minutes. Next, 12 parts of caustic soda are dissolved in 500 parts of water and added to the mixture with constant stirring until cold. When it has a density of 10° Bé. the solution may be further diluted by the addition of water without causing a precipitation of the resin. The mixture is a clear amber colored solution, and will hold for a long period of time without any increase of viscosity.

Example 7

|  | Parts |
|---|---|
| Cresylic acid | 200.0 |
| Sodium sulphite | 50.0 |
| Formaldehyde (40% aqueous solution) | 216.0 |
| Triethanolamine | 0.5 |
| Oleic acid | 0.2 |
| Water | 500.0 |

50 parts of sodium sulphite are dissolved in the cresylic acid, with constant stirring. Formaldehyde is added and the mixture agitated, the heat of reaction between the various ingredients brings the mass up to a temperature of about 75° C. and the mass is maintained at that temperature for about 45 to 60 minutes. The triethanolamine, oleic acid are next added to 500 parts of water and incorporated into the mass with constant stirring until cold.

In impregnating the aqueous fibrous mass with any of the foregoing aqueous solutions of partial condensation products, the proportions of resin forming ingredients to the total amount of water in the impregnating mixture is preferably such as to give the aqueous portion a Baumé of between 2 and 3. After the impregnation has been completed, a mineral acid, such as sulphuric or hydrochloric acid, or an acid salt, such as aluminum sulphate, may be added in sufficient quantity to cause a precipitation of the partial condensation product throughout the fibrous mass. This step, however, is not necessary if provision is made for reuse of the white water that is drained from the fibrous mass in the sheet forming operation.

My invention contemplates the addition to the fibrous mass of various treating agents, such as waterproofing compositions of waxes, pitches, wax tailings and the like. Before formation into a felted mat or sheet, the aqueous fibrous mass may be subjected to some sort of refining treatment, as by passage through a Jordan.

After such preliminary refining as may be desired, the aqueous mixture of fibers impregnated with the partial condensation product is formed into a mat or sheet of felted fibers on any suitable draining surface, such as a wire or screen. The aqueous fibrous mixture is flowed onto a wire, for instance, to a sufficient depth to produce the desired thickness of lumber, wall board or the like. Draining of the water from the fibrous mass may be assisted by vibrating the wire, by the use of suction boxes and by the use of extractor rolls and/or press rolls. The white water, that is, the water drained from the fibrous mass on the wire, may be re-used in the making up of subsequent batches of the fibrous material.

After their formation, the moist, matted fibers or sheets are subjected to a drying treatment to reduce the moisture content, preferably to about 15% or less. While it is possible to subject the wet sheets or slabs of fibrous material to pressure to extract a large proportion of the water, it is necessary in doing so to use a supporting wire to permit the liberation of the water from the fibrous mass. This leaves an undesirable wire mark on one surface of the board, whereas if the wet slabs or sheets are first dried to about 15% moisture content, they may be then charged directly into hydraulic presses and compressed between smooth platens to impart a smooth surface to both sides of the finished artificial lumber or wall board.

In the hydraulic press, the soft board or sheet is exposed to the simultaneous actions of heat and pressure, until the fibrous particles are compressed into one unitary sheet, board or slab. The pressure applied to the soft sheet may vary, as from 500 lbs. to 1000 lbs. per sq. in., and the temperature applied during the pressing action may also vary as from 100 to 180° C. The simultaneous action of the heat and pressure results in a completion of the reaction between the resin forming ingredients and in the formation of an insoluble synthetic resin. As a result of the heat and pressure, the synthetic resin so formed, together with the natural resinous and gummy matters of the raw wood fibers, serves to coalesce the fibers together into a coherent mass, the density of which will depend upon the proportion of synthetic resins employed and the pressures, temperatures and times employed in the pressing operation. Various types of boards may be made by varying these conditions, ranging from a light, porous board suitable for insulation to a hard, dense, water and fire resistant wall board.

Economical production of artificial lumber, wall board and the like in accordance with my method is made possible because of the fact that only minor proportions of synthetic resins are necessary to give a satisfactory degree of coherence, strength and rigidity to the finished product. By employing an aqueous solution of a partial condensation product of the synthetic resin and the formation of the resinous substances in situ on the fibers and within the fibrous mass, instead of using a dry, pulverized synthetic resin, I am enabled to utilize such small proportions of synthetic resins more effectively. Moreover, by using raw, uncooked woody materials instead of fibrous materials that have been subjected to cooking, digestion or to high temperatures and pressures to disintegrate them, I find that the natural strength and binding qualities of the fibers are more effectively realized in the manufacture of my product.

I am aware that numerous details of the process may be varied through a wide range without departing from the principles of this invention, and I, therefore, do not purpose limiting the patent granted hereon otherwise than necessitated by the prior art.

I claim as my invention:

1. The method of making artificial lumber and the like from waste raw cellulosic material, which comprises mechanically disintegrating woody waste in a wet state to produce a wet fibrous mass of the woody material in its natural uncooked state, incorporating into said mass an aqueous solution of synthetic resin forming ingredients, reacting the resin forming ingredients to produce a partial condensation product, agitating said mass to thoroughly impregnate the fibers with said partial condensation product, flowing said fibrous mass onto a draining surface to obtain a felted mat of fibers, partially drying said felted mat and subjecting said felted mat to sufficient heat and pressure to convert said partial condensation product into an infusible resin binding the fibers together.

2. The method of making artificial lumber and the like from waste raw cellulosic material, which comprises mechanically disintegrating woody waste in a wet state to produce a wet fibrous mass of the woody waste in its natural uncooked state, incorporating into said mass a preformed aqueous solution of a partial condensation product adapted to produce a synthetic resin, agitating said mass to thoroughly impregnate the fibers with said partial condensation product, flowing said fibrous mass onto a draining surface to obtain a felted mat of fibers, partially drying said felted mat and subjecting said felted mat to sufficient heat and pressure to convert said partial condensation product into an infusible resin binding the fibers together.

3. The method of making artificial lumber and the like from waste raw cellulosic material, which comprises mechanically disintegrating woody waste in a wet state to produce a wet fibrous mass of the woody waste in its natural uncooked state, incorporating into said mass a preformed aqueous solution of a partial condensation product prepared from cresylic acid and a methylene condensing agent, agitating said mass to thoroughly impregnate the fibers with said partial condensation product, flowing said fibrous mass onto a draining surface to obtain a felted mat of fibers, partially drying said felted mat and subjecting said felted mat to sufficient heat and pressure to convert said partial condensation product into an infusible resin binding the fibers together.

4. The method of making artificial lumber and the like from waste raw cellulosic material, which comprises mechanically disintegrating woody waste in a wet state to produce a wet fibrous mass of the woody waste in its natural uncooked state, incorporating into said mass a preformed aqueous solution of a partial condensation product prepared from urea, cresylic acid and a methylene condensing agent, agitating said mass to thoroughly impregnate the fibers with said partial condensation product, flowing said fibrous mass onto a draining surface to obtain a felted mat of fibers, partially drying said felted mat and subjecting said felted mat to sufficient heat and pressure to convert said partial condensation product into an infusible resin binding the fibers together.

5. The method of making artificial lumber and the like from waste raw woody material, which comprises mechanically disintegrating said raw woody material in a wet state to produce an aqueous fibrous mass of the woody material in its natural uncooked state, incorporating into said aqueous mass a water soluble partial condensation product prepared from cresylic acid and an aqueous solution of formaldehyde in an amount equivalent to from 3 to 25% by weight of the dry partial condensation product based on the dry weight of fibers, agitating the mass to thoroughly impregnate the fibers with the partial condensation product, precipitating the partial condensation product within said fibrous mass, flowing and draining said fibrous mass to form a felted mat of fibers and subjecting said mat of fibers to sufficient heat and pressure to convert said partial condensation product into an infusible resin binding the fibers into a hard, relatively dense board-like product.

6. The method of making artificial lumber and the like from waste raw woody material, which comprises mechanically disintegrating said raw woody material in a wet state to produce an aqueous fibrous mass of the woody material in its natural uncooked state, incorporating into said aqueous mass a water soluble partial condensation product prepared from cresylic acid and an aqueous solution of formaldehyde in an amount equivalent to from 3 to 25% by weight of the dry partial condensation product based on the dry weight of fibers, impregnating the fibers of the mass with the partial condensation product, precipitating the partial condensation product within said fibrous mass, flowing and draining said fibrous mass to form a felted mat of fibers, drying said mat to a moisture content not over about 15% and subjecting said mat of fibers to sufficient heat and pressure to convert said partial condensation product into an infusible resin binding the fibers into a hard, relatively dense board-like product.

7. The method of making artificial lumber and the like from waste raw woody material, which comprises mechanically disintegrating said raw woody material in a wet state to produce an aqueous fibrous mass of the woody material in its natural uncooked state, incorporating into said mass cresylic acid and formaldehyde, heating said mass without substantial concentration to a temperature not above the boiling point of water to convert said cresylic acid and formaldehyde into a water soluble partial condensation product and thoroughly agitating said mass to impregnate the fibers with said partial condensation product, precipitating the partial condensation product within said fibrous mass, flowing and draining said fibrous mass to form a felted mat of fibers and subjecting said mat of fibers to sufficient heat and pressure to convert said partial condensation product into an infusible resin binding the fibers into a hard, relatively dense board-like product.

8. The method of making artificial lumber and the like from waste raw woody material, which comprises mechanically disintegrating said raw woody material in a wet state to produce an aqueous fibrous mass of the woody material in its natural uncooked state, incorporating into said mass urea, cresylic acid and formaldehyde, heating said mass without substantial concentration to a temperature not above the boiling point of water to convert said urea, cresylic acid and formaldehyde into a water soluble partial condensation product and thoroughly agitating said mass to impregnate the fibers with said partial condensation product, precipitating the partial condensation product within said fibrous mass, flowing and draining said fibrous mass to form a felted mat of fibers and subjecting said mat of fibers to sufficient heat and pressure to convert said partial condensation product into an infusible resin binding the fibers into a hard, relatively dense board-like product.

9. The method of making artificial lumber and the like from waste, raw woody material, which comprises incorporating cresylic acid and an aqueous solution of formaldehyde in the proportions of at least 3 parts of 40% formaldehyde solution to 1 part by weight of cresylic acid into an aqueous mass of disintegrated raw woody material in its natural uncooked state, heating said mass to a temperature not above the boiling point of water to convert said cresylic acid and formaldehyde into a water soluble partial condensation product, allowing said partial condensation product to impregnate into the fibers of the mass, adding a mineral acid to effect precipitation of said partial condensation product within said fibrous mass, forming said fibrous mass into a felted mat, partially drying said mat and subjecting said partially dried mat to sufficient heat and pressure to convert said partial condensation product into an infusible resin and to compress said mat into a relatively hard, dense, board-like product with the resin binding the fibers thereof together.

JAMES V. NEVIN.